(12) United States Patent
Adachi

(10) Patent No.: US 8,594,421 B2
(45) Date of Patent: Nov. 26, 2013

(54) COLOR CORRECTION CIRCUIT AND IMAGE DISPLAY APPARATUS USING SAME

(75) Inventor: Takeshi Adachi, Kumagaya (JP)

(73) Assignees: Mitsumi Electric Co., Ltd., Tokyo (JP); ATRC Corporation, Saitama (JP)

( * ) Notice: Subject to any disclaimer, the term of this patent is extended or adjusted under 35 U.S.C. 154(b) by 579 days.

(21) Appl. No.: 12/675,330

(22) PCT Filed: Sep. 5, 2008

(86) PCT No.: PCT/JP2008/066104
§ 371 (c)(1),
(2), (4) Date: Feb. 25, 2010

(87) PCT Pub. No.: WO2009/031661
PCT Pub. Date: Mar. 12, 2009

(65) Prior Publication Data
US 2010/0226572 A1  Sep. 9, 2010

(30) Foreign Application Priority Data

Sep. 6, 2007 (JP) ................................. 2007-230953
Sep. 2, 2008 (JP) ................................. 2008-225251

(51) Int. Cl.
*G06K 9/00* (2006.01)
(52) U.S. Cl.
USPC .......................................... 382/167; 382/162
(58) Field of Classification Search
None
See application file for complete search history.

(56) References Cited

U.S. PATENT DOCUMENTS

| 6,753,930 | B2 * | 6/2004 | Kumakura et al. | 348/650 |
| 6,963,663 | B1 * | 11/2005 | Yoshida | 382/167 |
| 7,403,653 | B2 * | 7/2008 | Hirashima et al. | 382/167 |
| 7,447,352 | B2 * | 11/2008 | Kim | 382/162 |
| 2005/0058341 | A1 * | 3/2005 | Maruoka | 382/167 |
| 2005/0104895 | A1 | 5/2005 | Kiyama et al. | |
| 2006/0061842 | A1 | 3/2006 | Oka et al. | |
| 2006/0215044 | A1 | 9/2006 | Masuda et al. | |
| 2006/0245017 | A1 | 11/2006 | Aoki et al. | |

FOREIGN PATENT DOCUMENTS

| CN | 1838207 A | 9/2006 |
| JP | 2000-039862 | 2/2000 |
| JP | 2000-316095 | 11/2000 |
| JP | 2004-241882 | 8/2004 |
| JP | 2005-151074 A | 6/2005 |
| JP | 2006-093753 | 4/2006 |
| JP | 2006-267140 | 10/2006 |
| JP | 2007-017862 | 1/2007 |
| JP | 2006-311179 | 11/2009 |
| WO | WO 2006/095496 | 9/2006 |

OTHER PUBLICATIONS

Chinese Office Action mailed Nov. 14, 2011.
HSL and HSV, Wikipedia, the free encyclopedia, 2010.
Japanese Office Action mailed Mar. 27, 2012 with partial translation.

* cited by examiner

*Primary Examiner* — Li Liu
(74) *Attorney, Agent, or Firm* — IPUSA, PLLC

(57) ABSTRACT

A color correction circuit includes a detection part configured to detect the luminance information and chromaticity histogram information of an input video signal of one of an RGB color space and a YCbCr color space, the chromaticity histogram information including chroma and hue information; and a control part configured to control the color reproduction of the video signal based on the luminance information and the chromaticity histogram information detected by the detection part. The detection part includes a hue detection part configured to convert the video signal to an HSV color space and to detect a hue of the video signal from hues of the HSV color space.

4 Claims, 8 Drawing Sheets

FIG.4

(a) HUE...RED (b) HUE...BLUE

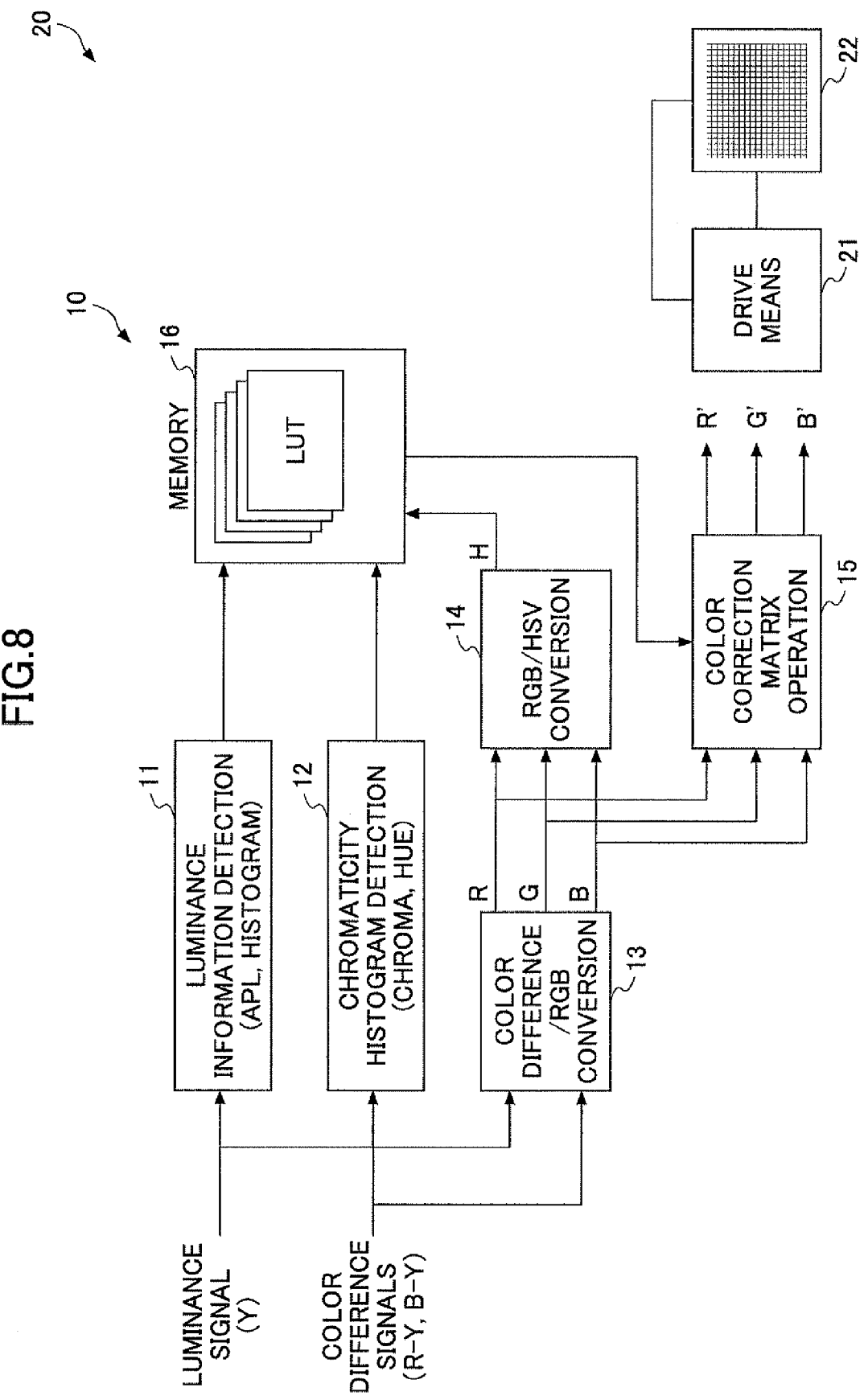

COLOR CORRECTION CIRCUIT AND IMAGE DISPLAY APPARATUS USING SAME

TECHNICAL FIELD

The present invention relates to a color correction circuit and an image display apparatus using the same, and more particularly to a color correction circuit for displaying a video signal using a display device such as a liquid crystal display (LCD) or a plasma display panel (PDP), and an image display apparatus using the same.

BACKGROUND ART

The conventional art for the present invention includes Japanese Laid-Open Patent Application No. 2006-311179 (Patent Document 1), Japanese Laid-Open Patent Application No. 2004-241882 (Patent Document 2), and Japanese Laid-Open Patent Application No. 2000-39862 (Patent Document 3).

Japanese Laid-Open Patent Application No. 2006-311179 proposes detecting color histogram information from color difference signals and detecting average luminance level and luminance histogram information from a luminance signal, thereby controlling the demodulation axes of the color difference signals; and obtaining a video signal of appropriate color saturation in combination with the luminance information. Japanese Laid-Open Patent Application No. 2004-241882 proposes the technique of performing histogram-conversion-type tone correction and color saturation correction in accordance with the luminance distribution of the flesh color part of one frame of a video signal in order to obtain a video of optimum flesh color. Further, Japanese Laid-Open Patent Application No. 2000-39862 proposes the technique of detecting the average luminance level of an input signal and controlling gain with the detected average luminance level, thereby controlling the chroma of a desired hue of the video signal, in order to prevent a decrease in chroma and display a video without dullness at low luminance levels on liquid crystal displays.

Patent Document 1: Japanese Laid-Open Patent Application No. 2006-311179.
Patent Document 2: Japanese Laid-Open Patent Application No. 2004-241882.
Patent Document 3: Japanese Laid-Open Patent Application No. 2000-39862.

DISCLOSURE OF THE INVENTION

Problems to be Solved by the Invention

However, of the above-described conventional techniques, the technique of Japanese Laid-Open Patent Application No. 2006-311179 adjusts the demodulation axes of color difference signals in order to control color, thus causing a change in hue as a whole. Further, as color information, only chroma is detected and no hue is detected. Therefore, it is difficult to perform optimum color correction. Further, according to the technique described in Japanese Laid-Open Patent Application No. 2004-241882, tone and color saturation are corrected with respect to only the flesh color part of a video signal, and it is difficult to perform correction with respect to colors in other ranges. According to the technique of Japanese Laid-Open Patent Application No. 2000-39862, chroma is increased when luminance is low. However, this is not chroma control based on chroma information. Therefore, it may be possible to further increase chroma at a time of high chroma when luminance is low.

In view of these conventional techniques, according to one aspect of the present invention, there are provided a color correction circuit and an image display apparatus using the same, the color correction circuit being capable of performing an optimum color correction on a video signal by emphasizing or suppressing a specific hue (increasing a slight difference in hue or reducing a difference in hue) in accordance with a characteristic of a video based on its luminance information and chromaticity histogram and of correcting the color characteristics of a display device such as a liquid crystal display by performing color correction on a desired hue.

Means for Solving the Problems

According to one aspect of the present invention, a color correction circuit includes a detection part configured to detect the luminance information (average luminance level and luminance histogram) and chromaticity histogram information including chroma (or saturation) and hue of an input video signal, and a control part configured to control the color reproduction of the video signal based on the luminance information and the chromaticity histogram information detected by the detection part.

As a result, information on the video signal is detected based on the chromaticity histogram information including chroma and hue. Accordingly, it is possible to realize color reproduction with high accuracy based on the chroma and hue information.

In the color correction circuit, the luminance information may include a luminance histogram and average luminance information in one or more field periods or in one or more frames of the video signal, and the chromaticity histogram information may include a chromaticity histogram including a hue histogram and a chroma histogram.

This makes it possible to obtain luminance, hue, and chroma information on the basis of the field or frame of the video signal, thus allowing the color correction circuit to be applied to television receivers and other various image display apparatuses of both the interlace system and the progressive system.

In the color correction circuit, the detection part may have a hue detection part configured to convert the video signal of RGB or YCbCr to an HSV color space and to detect a hue of the video signal from hues of the HSV color space.

This makes it possible to specify a hue to be corrected in the HSV color space where it is easy to specify a hue and to selectively perform color correction on a desired specific color without affecting other hues of RGB signals.

In the color correction circuit, the control part may include a color correction matrix operation part configured to correct a hue of the video signal in accordance with the status of the average luminance information, the luminance histogram, and the chromaticity histogram, and a memory configured to store multiple matrix coefficients used for the operation of the color correction matrix operation part as look-up tables.

This makes it possible to easily and immediately make a correction to change a color reproduction range or the like in accordance with the characteristics of the video signal.

In the color correction circuit, the matrix coefficients may be coefficients correcting necessary hues in accordance with a color characteristic of a display device configured to display the video signal.

An image display apparatus according to one aspect of the present invention includes the color correction circuit and a display device configured to display a video signal corrected by the color correction circuit.

Effects of the Invention

According to the present invention, it is possible to correct a color of a necessary portion of a video signal without affecting other colors in accordance with the conditions of the average luminance level, the luminance histogram, the color saturation histogram, and the hue histogram of a video signal, so that it is possible to display images with good color reproducibility. Accordingly, significant practical effects are achieved.

BRIEF DESCRIPTION OF THE DRAWINGS

FIG. 4 is a diagram illustrating chroma histograms. FIG. 4(a) is a diagram illustrating a chroma histogram of a red hue. FIG. 4(b) is a diagram illustrating a chroma histogram of a blue hue.

FIG. 8 is a diagram illustrating an image display apparatus 20 to which a color correction circuit 10 according to this embodiment is applied.

Figure 1:
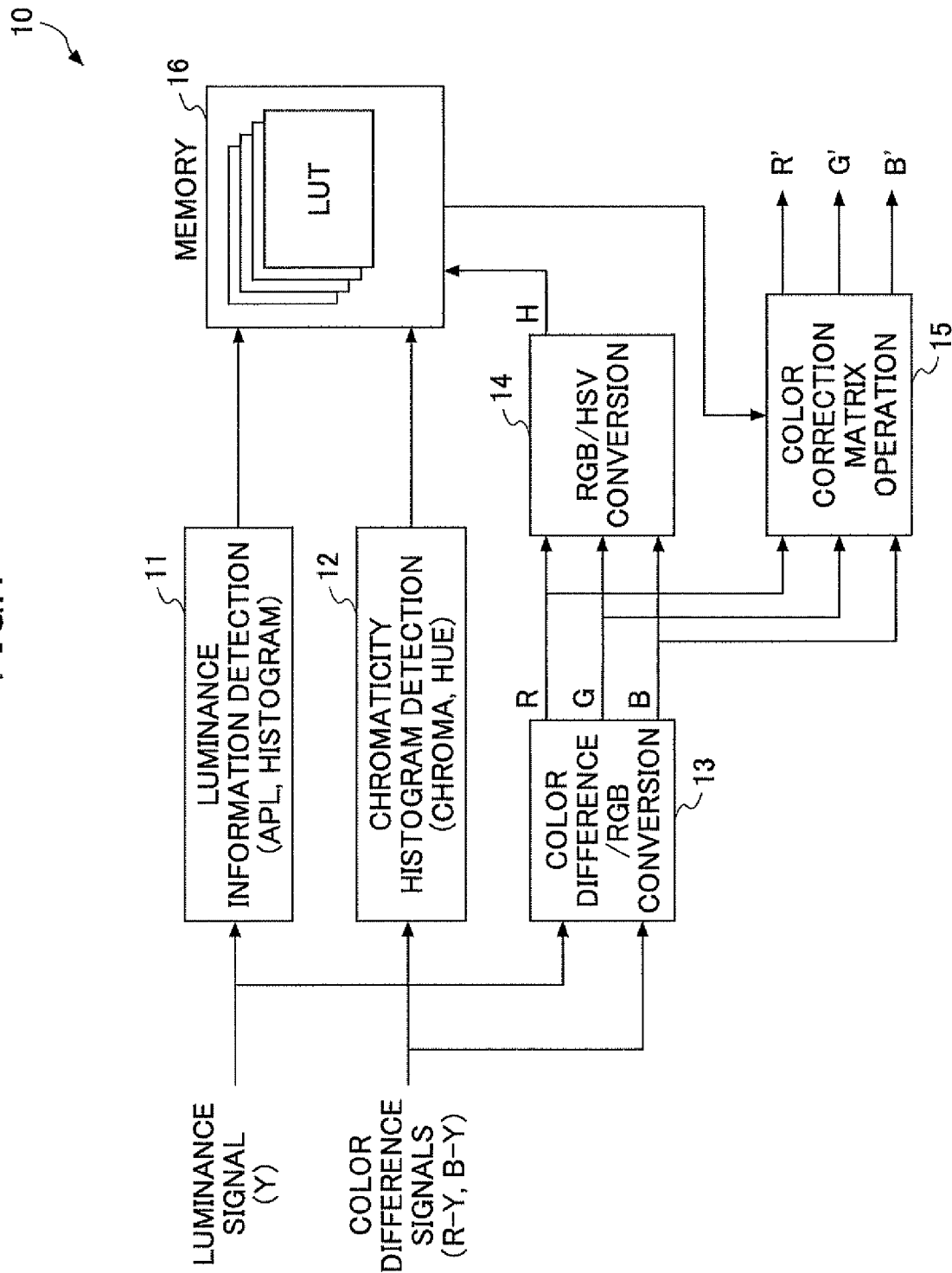
FIG. 1 is a block diagram illustrating a system configuration of an embodiment according to the present invention.

DESCRIPTION OF THE REFERENCE NUMERALS 10 color correction circuit
11 luminance information (APL average level, histogram) detection part
12 chromaticity (chroma, hue) histogram detection part
13 part converting color difference signals (R-Y, B-Y) into RGB signals
14 part converting an RGB color space to an HSV color space
15 memory (for storing LUT look-up tables)
16 color correction matrix operation part
20 image display apparatus
21 drive means
22 display device

BEST MODE FOR CARRYING OUT THE INVENTION

A description is given below, with reference to the drawings, of a best mode for carrying out the present invention.

FIG. 1 illustrates a color correction circuit 10 according to an embodiment of the present invention. In FIG. 1, the color correction circuit 10 according to this embodiment has a luminance information detection circuit 11, a chromaticity histogram detection circuit 12, a color difference-to-RGB conversion part 13, an RGB-to-HSV conversion part 14, a color correction matrix operation part 15, and a memory 16.

In FIG. 1, the luminance information detection circuit 11 is a detector circuit configured to detect, from a luminance signal, its APL (average luminance level) and luminance histogram in at least one field or one frame. The luminance information detection circuit 11 may detect luminance information including an average luminance level and a luminance histogram not on the basis of one field or one frame but on the basis of multiple fields or frames of a video signal.

Figure 2:
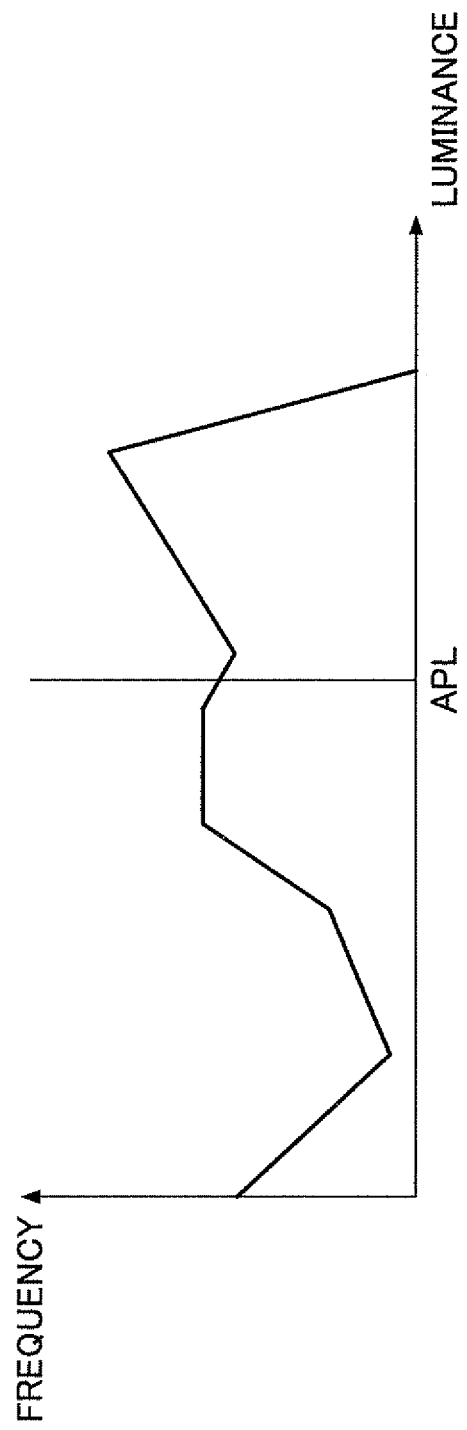
FIG. 2 is a diagram illustrating a luminance histogram detected by a luminance information detection circuit 11.

FIG. 2 is a diagram illustrating a luminance histogram detected by the luminance information detection circuit 11. As illustrated in FIG. 2, in the luminance histogram, the horizontal axis represents luminance and the vertical axis represents frequency. The luminance may be expressed with 0 to 255 tone levels. The luminance histogram makes it possible to detect a luminance level that is high in a video signal, for example, to determine whether the video signal is a whitish image or a blackish image. Further, the luminance detection circuit 11 also detects the average luminance level APL of a luminance signal from the input video signal.

Figure 3:
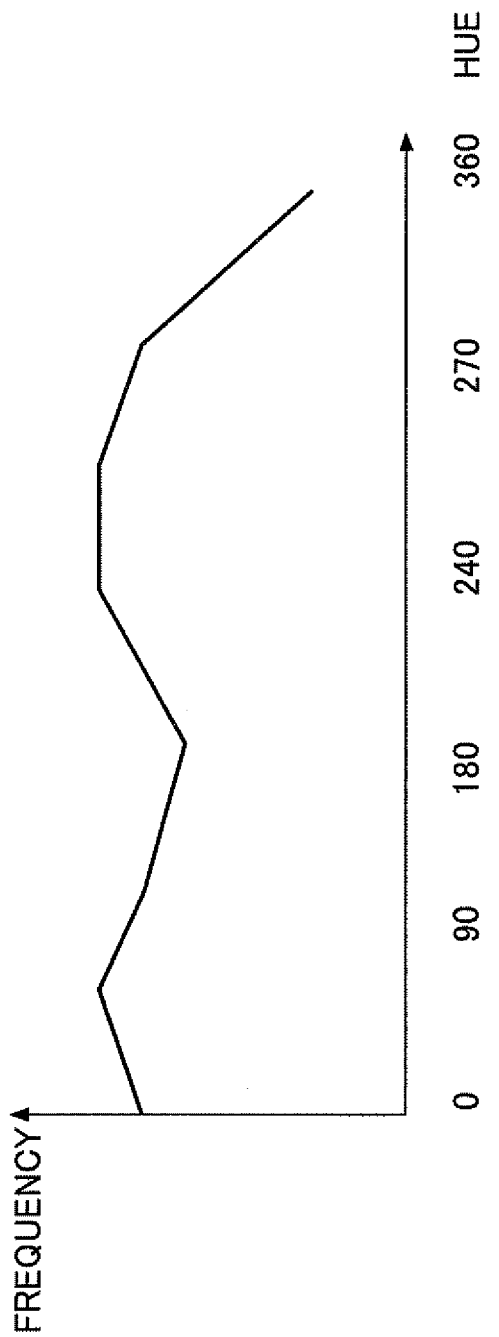
FIG. 3 is a diagram illustrating a hue histogram.

Referring back to FIG. 1, the chromaticity histogram detection circuit 12 is a detector circuit configured to detect a chromaticity (chroma and hue) histogram in the same field as the luminance signal. FIG. 3 is a diagram illustrating a hue histogram detected by the chromaticity histogram detection circuit 12. As illustrated in FIG. 3, in the hue histogram, the horizontal axis represents hue and the vertical axis represents frequency. The hue may be expressed as a hue histogram corresponding to a color wheel with red, yellow, green, cyan, blue, magenta, etc., assigned to 0 to 360° in correspondence to the color wheel. It is possible to detect a distribution of hues included in the video signal.

Figure 4:
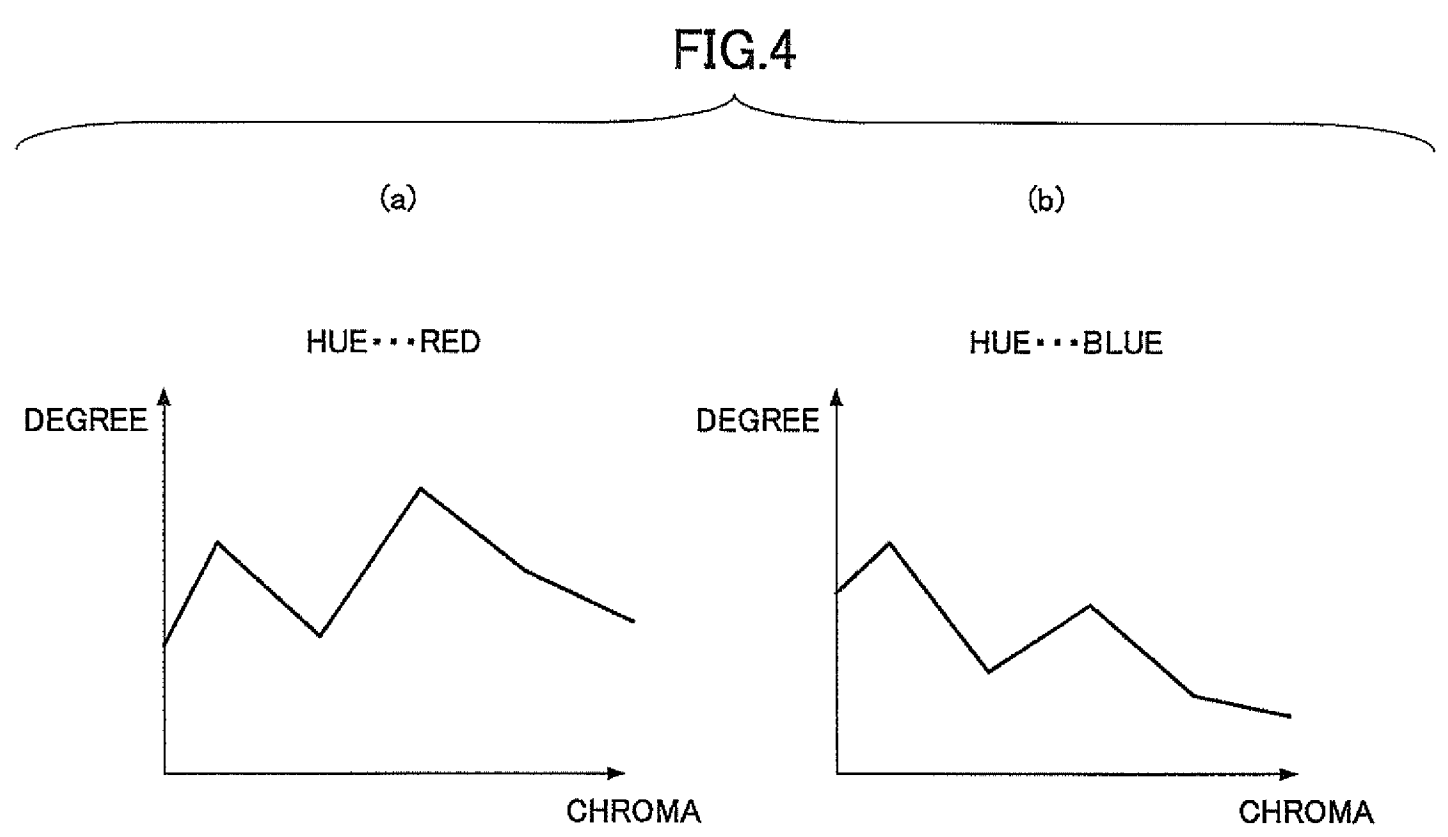

FIG. 4 is a diagram illustrating chrome histograms detected by the chromaticity histogram detection circuit 12. The chrome histogram may be created on a hue-by-hue basis. FIG. 4(a) illustrates a chrome histogram in the case of a red hue, and FIG. 4(b) illustrates a chroma histogram in the case of a blue hue. The chrome histogram is a histogram indicating a distribution of color vividness, intensity, or density, where color becomes denser and more vivid as the chroma becomes higher and color becomes more muted or lighter as the chroma becomes lower. Thus, the chrome histogram makes it possible to detect the degree or frequency of vividness of each hue. The chrome histogram may be detected and created for any selected hue.

Thus, the chromaticity histogram detection circuit 12 is capable of detecting the chromaticity histogram of an input video signal including its hue histogram and chrome histogram and of detecting the color characteristics of the video signal. Like the luminance information detection circuit 11, the chromaticity histogram detection circuit 12 also is capable of detecting the chromaticity histogram of an input video signal including its hue histogram and chroma histogram on the basis of one or more fields or one or more frames of the input video signal.

Referring back to FIG. 1, the color difference-to-RGB conversion part 13 is a circuit configured to convert an input luminance (Y) signal and color difference signals (R-Y, B-Y) into R, G, and B signals. Specifically, the color difference-to-RGB conversion part 13 converts the luminance (Y) signal and color difference signals (R-Y, B-Y) of an input video signal into RGB signals. For example, the color difference-to-RGB conversion part 13 converts a video signal expressed with a YCbCr color space into an RGB color space and outputs the converted video signal, using transformations from YCbCr signals to RGB signals as illustrated in Eq. (1) through Eq. (3).

$$R = Y + 1.402 Cr \quad (1)$$

$$G = Y - 0.714 Cr - 0.344 Cb \quad (2)$$

$$B = Y + 1.772 Cb \quad (3)$$

Figure 5:
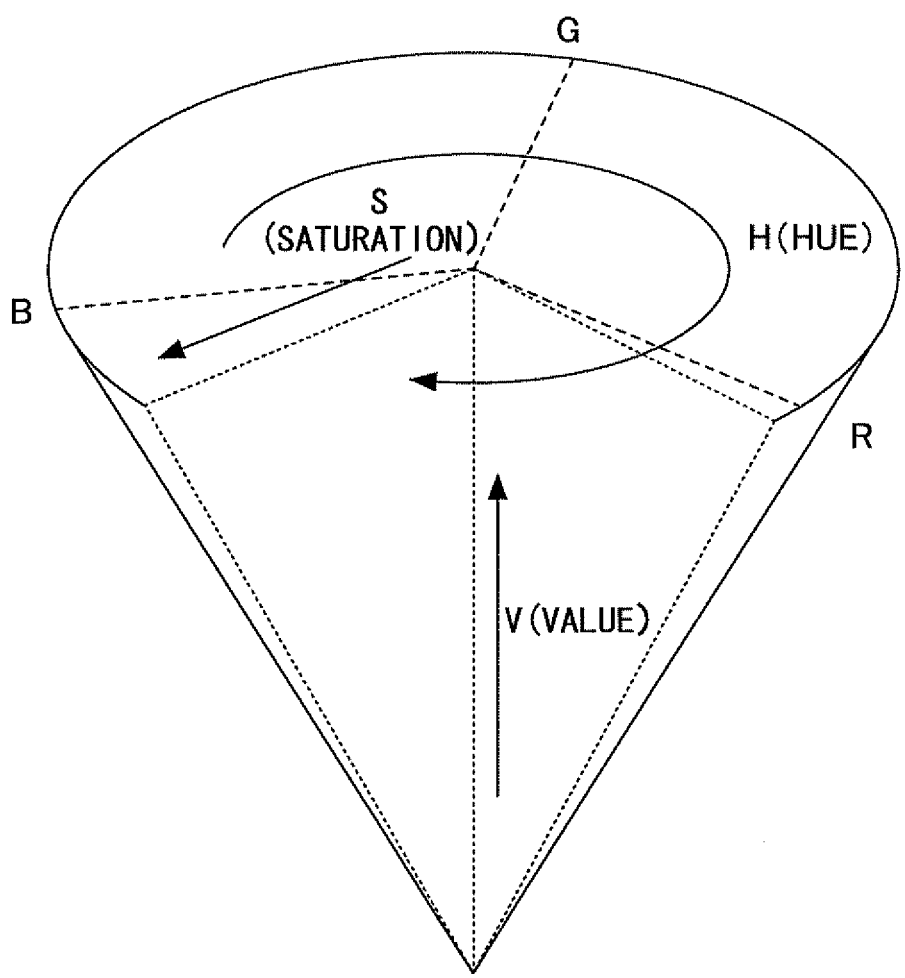
FIG. 5 is a diagram illustrating an HSV color space.

The RGB-to-HSV conversion part 14 is a computation part configured to convert the RGB signals into HSV (Hue, Saturation, Value) signals. FIG. 5 is a diagram illustrating an HSV space. The RGB-to-HSV conversion part 14 converts the RGB signals due to conversion in the color difference-to-RGB conversion part 13 into an HSV (Hue, Saturation, Value) space as illustrated in FIG. 5. The conversion from the RGB color space into the HSV color space is as follows. (Reference document: Wikipedia, the free encyclopedia.) Assuming that R, G, and B are in the range of 0.0 to 1.0 where 0.0 is a minimum and 1.0 is a maximum, HSV values in the HSV colorimetric system corresponding to the RGB values defined in the RGB color space are determined by the following Eq. (4) through Eq. (6). Here, it is assumed that Max and Min are equal to the maximum and minimum, respectively, of RGB values.

$$H = \begin{cases} 60 \times \frac{G-B}{Max-Min} + 0, & \text{if } Max = R \quad (4) \\ 60 \times \frac{B-R}{Max-Min} + 120, & \text{if } Max = G \quad (5) \\ 60 \times \frac{R-G}{Max-Min} + 240, & \text{if } Max = B \quad (6) \end{cases}$$

$$S = Max - Min$$

$$V = Max$$

where H=0 when Max=Min (S=0), and S=0 when Max=0 (V=0).

In the HSV color space expressed with a conic shape as illustrated in FIG. 5, the hue (H) is expressed with angles of 0 to 360° along the circular ring of the cone, the saturation (S) changes within the range of 0 to 1.0 in length from the center of the circle, and the value (V) changes within the range of values of 0 to 1.0 in length from the vertex of the cone to the center of the circle. It is because the HSV color space is more similar to the color perception method of human beings than the RGB color space is that the HSV color space is often employed in computer graphics applications. Since this makes it possible to specify a color close to a human sense, such as a flesh color, it is possible to facilitate detection of a color desired to be corrected in optimizing colors to be displayed on an image display apparatus such as a television or a video monitor. Accordingly, it is easy to control color correction. Further, with the HSV colorimetric system, it is possible to extract a flesh-color region specific color with ease.

Thus, in the HSV color space, it is possible to easily detect a hue desired to be subjected to color correction by specifying a color close to a human sense, thus facilitating color correction control. Taking advantage of this, the RGB-to-HSV conversion part 14 in FIG. 1 further converts a video signal converted into RGB signals in the color difference-to-RGB conversion part 13 into a video signal of the HSV color space. This makes it possible to perform color correction that is flexibly adaptable to characteristics of various video signals.

In FIG. 1, the color difference signals R-Y and B-Y are converted into RGB signals in the color difference-to-RGB conversion part 12, and the RGB signals are thereafter converted into signals of the HSV color space in the RGB-to-HSV conversion part 14. However, in the case of an application to image display apparatuses to which RGB signals are input as a video signal, the color difference-to-RGB conversion part 13 may not be provided and the video signal may be input directly to the RGB-to-HSV conversion part 14.

Referring back to FIG. 1, the color correction matrix operation part 15 is an operation part configured to perform color correction based on the luminance information and the chromaticity information. The memory 16 is storage means (including a memory control part) for storing matrix coefficients necessary in performing color correction operations as look-up tables.

When considering performing color correction optimum for the characteristics of an input video signal based on luminance information and chromaticity histogram information, which is a main purpose of the present invention, in the HSV colorimetric system, it is possible to emphasize red colors by letting G and B of the input video signal RGB be G(1+kr·R) and B(1+kb·R), respectively, if it is desired to increase a slight difference between red hues, for example. On the other hand, if it is desired to reduce a difference between red hues, the input G and B may be made G(1−kr·R) and B(1−kb·R), respectively. In order to put such color correction in practice, a matrix operation as illustrated in Eq. (7) described below is performed in the color correction matrix operation part 15. The matrix coefficients are prepared in advance as multiple necessary look-up tables and contained in the memory 16. A matrix that matches the characteristics of an input video signal may be selected from among them. For example, if the characteristic patterns of input video signals are determined in advance, and a look-up table to be referred to is determined by the pattern of an input video signal, it is possible to immediately perform an optimum color correction according to the characteristics of the input video signal with ease.

$$\begin{pmatrix} R' \\ G' \\ B' \end{pmatrix} = \begin{pmatrix} kr1 & kr2 & kr3 \\ kg1 & kg2 & kg3 \\ kb1 & kb2 & kb3 \end{pmatrix} \begin{pmatrix} R \\ G \\ B \end{pmatrix} \quad (7)$$

Unlike the method of correcting colors by changing modulation axes, the color correction according to the present invention hardly affects other colors even when correcting a certain color. Further, since a conversion part configured to convert a video signal RGB into the HSV color space is provided, a hue (for example, a flesh color) of a video of an input signal which video is desired to be subjected to color correction may be detected easily from the hue H converted to the HSV color space.

The chromaticity histogram, which is detected from color difference signals in FIG. 1, may also be detected from the hue H and the chroma S after conversion into the HSV color space.

Further, in FIG. 1, the luminance information detection circuit 11, the chromaticity histogram detection circuit 12, the color difference-to-RGB conversion part 13, and the RGB-to-HSV conversion part 14, as a whole, form a detection part in the CLAIMS. Of these, the color difference-to-RGB conversion part 13 and the RGB-to-HSV conversion part 14 form hue detection means. On the other hand, the memory 16 and the color correction matrix operation part 15 form a control part in the CLAIMS.

Next, a description is given below, with respect to the color correction circuit 10 including the color correction matrix operation part 15, configured as described above, of its operations. The luminance information (average luminance level and luminance histogram) and the chromaticity histogram of at least one field or one frame of a video signal are detected in the luminance information detection part 11 and the chromaticity histogram detection part 12, respectively, in FIG. 1, and the information is supplied to a non-graphically-represented memory control part of the memory 16 containing look-up tables of matrix coefficients. The input video signal (Y, R-Y, B-Y) is converted into RGB signals in the color difference-to-RGB conversion part 13, and is thereafter converted to an HSV color space in the RGB-to-HSV conversion part 14. In the case of correcting a color, for example, a flesh color, of a certain portion of the input video signal based on the luminance information and the chromaticity histogram, a video of a portion corresponding to the skin color is read from the hue H converted to HSV, and a matrix operation is performed with the matrix coefficient and the input RGB signals in the color correction matrix operation part 15. Thus, it is possible to easily determine which hue color to correct because H (hue) of the HSV color space represents hue. With respect to the look-up tables, a necessary number of multiple matrix coefficients are prepared in advance in correspondence to video signal characteristics.

Figure 6:
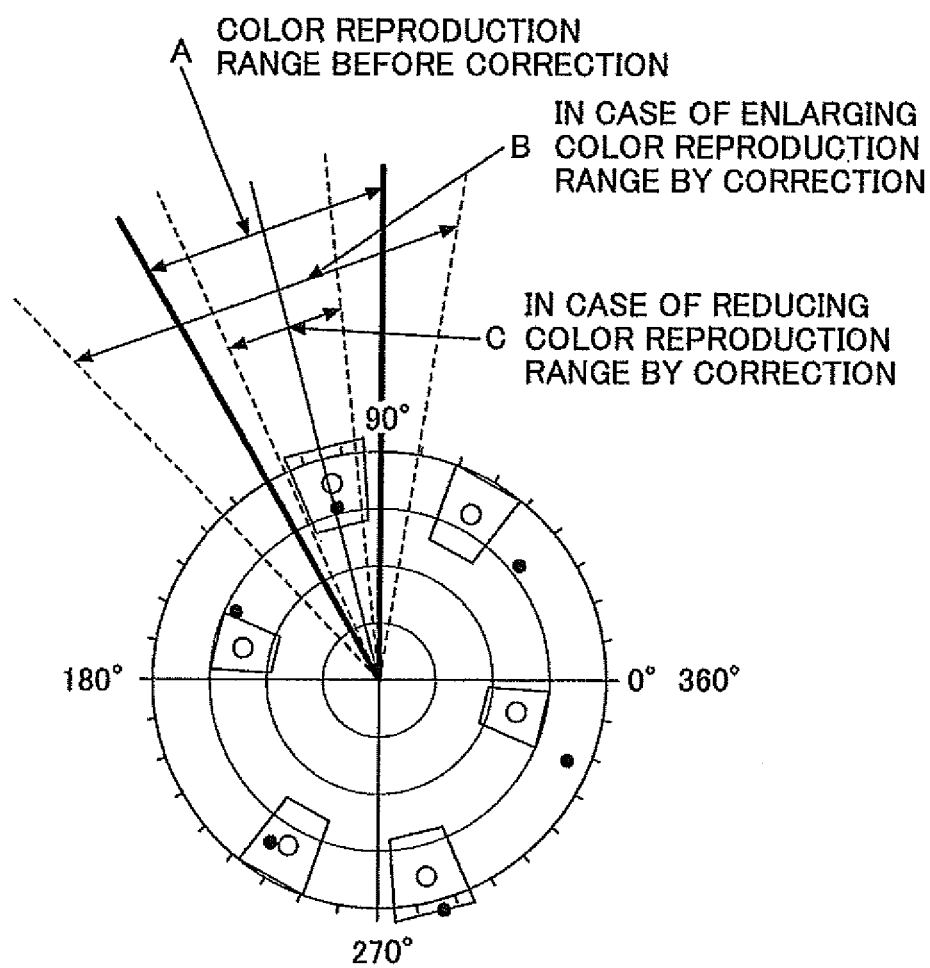
FIG. 6 is a vector diagram illustrating a color correction of the embodiment according to the present invention.

A description is given, using FIG. 6 representing a video signal with a vector scope, of the specific contents of color correction according to the present invention. In FIG. 6, A indicates a reproduction range of red colors before correction, B indicates the color reproduction range enlarged by the correction, and C indicates the color reproduction range reduced by the correction. For example, in the case of a video of a medical scene with a lot of red colors such as blood vessel and blood colors, even colors of the same red may be desired to have their slight differences emphasized. In such a case, this may be achieved by enlarging the reproduction range as in B of FIG. 6. Likewise, if it is desired, in a video observing plants and animals in nature, to distinguish between plants and animals mixed and hidden into greenery for observation, the observation of plants and animals may be facilitated by causing even colors of the same green to have their differences emphasized.

Figure 7:
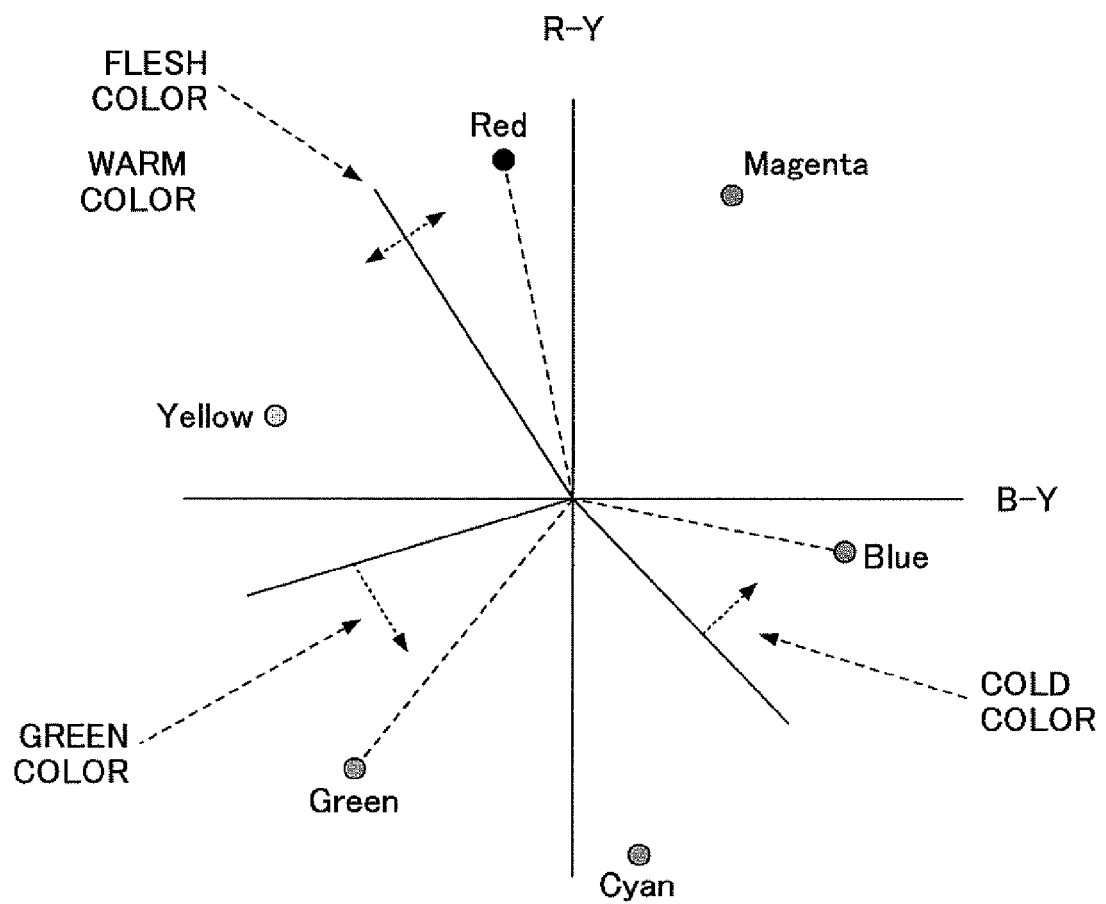
FIG. 7 is another vector diagram illustrating the color correction of the embodiment according to the present invention.

FIG. 7 is a vector diagram of a video signal different from FIG. 6 for describing the color correction performed by the color correction circuit 10 according to this embodiment. For example, if it is desired with respect to a flesh color to slightly change the hue of the flesh color under some luminance information and chromaticity histogram in the color correction circuit 10 according to this embodiment, such a matrix coefficient as to change the hue of the flesh color of FIG. 7 may be prepared and read from the memory 16, and a color correction matrix operation may be performed in the color correction matrix operation part 15.

Further, in televisions, it may be desired to slightly change the hues of a warm color, a cold color, and a green color independently from one another because of a difference in color characteristics between display panels of liquid crystal or the like. In such a case as well, it is possible to perform color correction with a color correction matrix operation by preparing matrix coefficients that match the respective hues as look-up tables, storing them in the memory 16, and reading a necessary matrix coefficient.

FIG. 8 is a diagram illustrating an image display apparatus 20 to which the color correction circuit 10 according to this embodiment is applied. In addition to the color correction circuit 10 according to the embodiment described so far, the image display apparatus 20 according to this embodiment has a display device 22 and drive means 21.

As the display device 22, various display devices 22 may be applied, such as a CRT (Cathode Ray Tube, Braun tube), a liquid crystal display device, a plasma display panel, and an EL (Electro-Luminescent) display device.

The drive means 21 is a circuit for driving the display device 22, and drive means appropriate for driving the display device 22 may be applied. For example, the drive means 21 may be an electron gun if the display device 22 is a CRT, and may be an integrated circuit for driving including an X driver and a Y driver if the display device 22 is a liquid crystal display device. Further, for example, the drive means 21 may be a driver circuit including an address driver, a scan driver, a sustain driver, etc., if the display device 22 is a plasma display panel, and may be a matrix driver circuit using a thin film transistor if the display device 22 is an EL display device.

Thus, the color correction circuit 10 according to this embodiment may be applied to image display apparatuses 20 with various display devices 22. Further, for any of the display devices 22, it is possible to perform color correction without changing demodulation axes, and it is possible to perform correction only on a hue that requires correction in accordance with the characteristics of the display device 22. As a result, the image display apparatus 20 is capable of performing an appropriate color correction that matches respective color characteristics on different kinds of display devices 22 such as a CRT, a liquid crystal display device, a plasma display panel, and an EL display device.

Further, the color correction circuit 10 according to this embodiment may be formed on a semiconductor substrate such as a semiconductor wafer and packaged as a semiconductor integrated circuit device. This makes it possible to mount a color correction circuit according to this embodiment on an image display apparatus with ease, and allows the image display apparatus to be compact in size.

A detailed description is given above of a preferred embodiment of the present invention. However, the present invention is not limited to the above-described embodiment, and variations and replacements may be added to the above-described embodiment without departing from the scope of the present invention.

The present international application claims priority based on Japanese Patent Application No. 2007-230953, filed on Sep. 6, 2007, and Japanese Patent Application No. 2008-225251, filed on Sep. 2, 2008. The entire contents of Japanese Patent Application Nos. 2007-230953 and 2008-225251 are incorporated herein into the present international application by reference.

The invention claimed is:

1. A color correction circuit, comprising:
a luminance information detection circuit configured to detect luminance information that includes a luminance histogram and average luminance information in one or more field periods or in one or more frames of an input video signal;
a chromaticity histogram information detection circuit configured to detect chromaticity histogram information that includes a chromaticity histogram including a hue histogram and a chroma histogram of the video signal;
a hue detection part configured to convert an RGB signal to an HSV color space and to detect a hue of the video signal from hues of the HSV color space,
wherein the RGB signal is input as the video signal or obtained by converting a YCbCr signal input as the video signal;
a memory configured to store matrix coefficients used for a color correction matrix operation as a look-up table;
a memory control part configured to determine a color of the video signal to be corrected based on the luminance histogram and the average luminance information detected in the luminance information detection circuit, the hue histogram and the chroma histogram detected in the chromaticity histogram information detection circuit, and the hue detected in the hue detection part; and a color correction matrix operation part configured to correct a hue of the color of the video signal determined to be corrected by the color correction matrix operation using the matrix coefficients and the RGB signal before being converted to the HSV color space.

2. The color correction circuit as claimed in claim 1, wherein:

the color correction matrix operation part is configured to correct the hue of the color of the video signal in accordance with a status of the average luminance information, the luminance histogram, and the chromaticity histogram.

3. The color correction circuit as claimed in claim 1, wherein the matrix coefficients are coefficients correcting necessary hues in accordance with a color characteristic of a display device configured to display the video signal.

4. An image display apparatus, comprising:

the color correction circuit as set forth in claim 1; and a display device configured to display a video signal corrected by the color correction circuit.

* * * * *